United States Patent [19]

Tsutsui

[11] Patent Number: 4,949,801
[45] Date of Patent: Aug. 21, 1990

[54] PARTS-MOUNTING ARRANGEMENT OF INDUSTRIAL VEHICLE

[75] Inventor: Ryuji Tsutsui, Tokyo, Japan

[73] Assignee: Nissan Motor Co., Ltd., Yokohama, Japan

[21] Appl. No.: 307,105

[22] Filed: Feb. 7, 1989

[30] Foreign Application Priority Data

Feb. 9, 1988 [JP] Japan .................................. 63-16188

[51] Int. Cl.⁵ .......................... B62D 25/20; B60K 1/00
[52] U.S. Cl. ................................... 180/90.6; 180/65.1;
74/512; 74/513
[58] Field of Search ................ 180/90.6, 65.1; 74/512,
74/513, 560; 192/1.1, 1.56; 296/194, 197, 190

[56] References Cited

U.S. PATENT DOCUMENTS

| 3,380,317 | 4/1968 | Liljequist | 74/513 X |
| 4,672,860 | 6/1987 | Parker | 74/560 X |
| 4,683,977 | 8/1987 | Salmon | 74/512 X |
| 4,695,819 | 9/1987 | Bowsher | 74/512 X |

FOREIGN PATENT DOCUMENTS 2941345 4/1981 Fed. Rep. of Germany ........ 74/513
57-189931 12/1982 Japan .

Primary Examiner—Charles A. Marmor
Assistant Examiner—Brian L. Johnson
Attorney, Agent, or Firm—Pennie & Edmonds

[57] ABSTRACT

An improved vehicle control parts-mounting arrangement in an electrically powered motor vehicle having a traction motor, a traction motor room for housing the motor, and two side frame members extending longitudinally along both sides of the traction motor room. The arrangement comprises a first and second group of parts mounted to a supporting plate which extends across an upper open portion of the traction motor room with each end secured to the corresponding side frame member. The first parts group includes a brake pedal, a brake booster, and its energizing vacuum pump. The second parts group includes an accelerator pedal and an acceleration control unit. The supporting plate is provided with an aperture through which the mounted brake booster vacuum pump extends into the traction motor room.

8 Claims, 2 Drawing Sheets

4,949,801

PARTS-MOUNTING ARRANGEMENT OF INDUSTRIAL VEHICLE

BACKGROUND OF THE INVENTION

1. Field of the Invention

The present invention relates in general to a parts-mounting arrangement of a motor vehicle, and more particularly, to a parts-mounting arrangement of an electrically powered industrial vehicle, such as a lift truck or the like. More specifically, the present invention is concerned with a parts-mounting arrangement for such motor vehicle types which supports thereon various operation control parts of the vehicle.

2. Description of the Prior Art

Japanese Utility Model First Provisional Publication 57-189931 shows one conventional parts-mounting arrangement of an electrically powered industrial vehicle. In the arrangement, similar to the case of gasoline-powered industrial vehicles, the brake parts (such as, brake pedal, brake booster and the like) and the acceralator parts (such as, accelerator pedal, acceleration control unit and the like) are all mounted to a common instrument panel through brackets. Furthermore, the vaccum pump for actuating the brake booster is mounted also to the instrument panel through an exclusive bracket.

However, the arrangement has an inherent drawback due its now integrated assembly.

In particular, since the operation control parts are independently mounted to the instrument panel through respective brackets, the number of parts is increased and thus assembly of such a large number of parts is difficult or at least troublesome. In fact, the assembly of the parts is most frequently performed by stretching operator's hand or hands awkwardly under, up and around the lower side of the instrument panel.

SUMMARY OF THE INVENTION

It is therefore an object of the present invention to provide an improved parts-mounting arrangement of an electrically powered industrial vehicle.

According to the present invention, there is provided an improved parts-mounting arrangement in an electrically powered motor vehicle having a traction motor, a traction motor room for housing therein the motor, and two side frames extending longitudinally along both sides of the traction motor room. The arrangement comprises a first group of parts including a brake pedal, a brake booster and a vacuum pump for energizing the brake booster; a second group of parts including an accelerator pedal and an acceleration control unit; a supporting plate having the first and second groups of parts assembled thereon, the supporting plate extending across an upper open portion of the traction motor room and being seated at its opposed ends to the side frames and secured to the same; and means defining in the supporting plate an aperture through which a part of the vacuum pump is projected into the traction motor room.

BRIEF DESCRIPTION OF THE DRAWINGS

Other objects will be apparent from the following description when taken in conjuction with the accompanying drawings, in which.

DETAILED DESCRIPTION OF THE INVENTION

Figure 1:
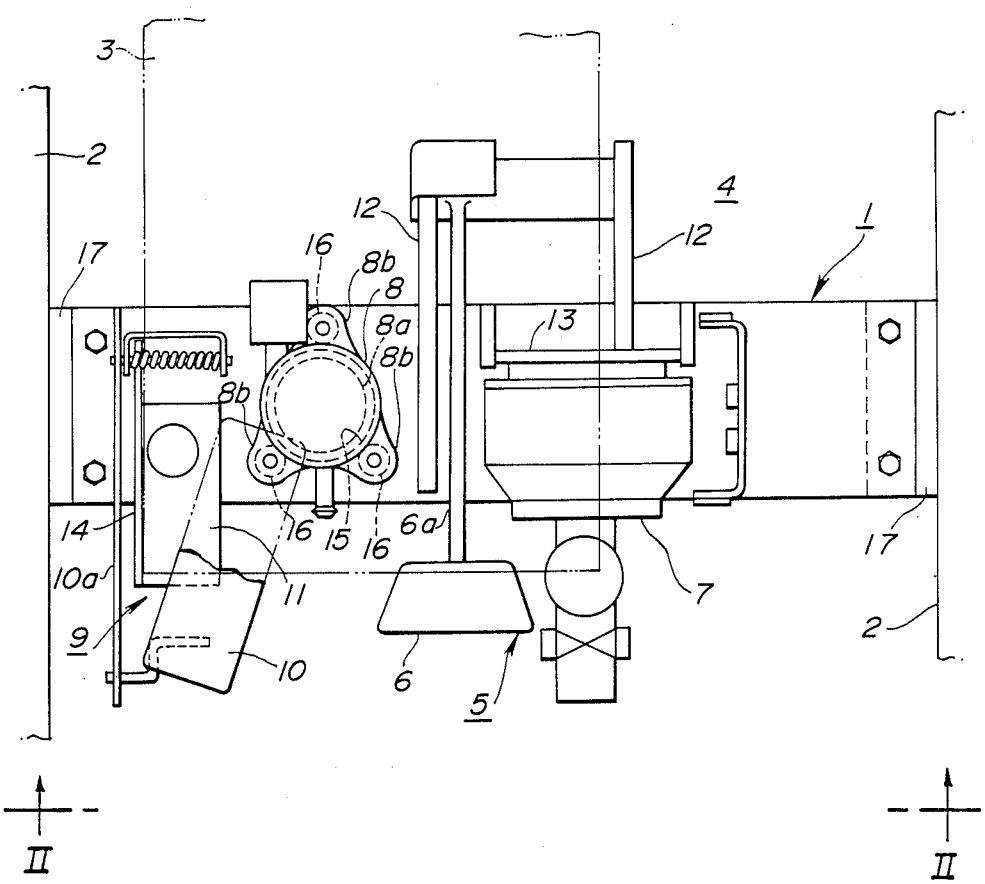
FIG. 1 is a plan view of an essential portion of an electrically powered industrial vehicle, to which the present invention is practically applied.

Referring to the drawings, there is shown an improved parts-mounting arrangement of an electrically powered fork lift truck, according to the present invention.

Denoted by numerals 2 and 2 are side frames of a body of the vehicle. A supporting plate 1 extends across the side frames 2 and 2 in a manner to cover, together with a floor deck plate (not shown), an upper open portion of a traction motor room 4 in which a traction motor 3 is installed. The side frames 2 and 2 extend longitudinally along respective sides of the traction motor room 4.

Brake parts 5, such as, a brake pedal 6, a brake booster 7 and a vacuum pump 8, and accelerator parts 9, such as, an accelerator pedal 10 and an acceleration control unit 11, are all mounted to the supporting, plate 1. It is to be noted that during assembly the parts 5 and 9 are mounted to the supporting plate 1 before the latter is mounted to the side frames 2 and 2.

The brake pedal 6 has its pedal arm 6a pivotally connected to a generally U-shaped bracket 12 which is welded to the supporting plate 1. The brake booster 7 is tightly bolted to a supporting wall 13 of the bracket 12.

The acceleration control unit 11 is fixed to a supporting wall 14 which is arranged on a left side (as viewed in FIG. 1) of the supporting plate 1. The accelerator pedal 10 has its pedal arm 10a pivotally connected to the supporting wall 14.

The vacuum pump 8 for feeding the brake booster 7 with a vacuum is arranged on the supporting plate 1 at a position between the brake pedal 6 and the accelerator pedal 10.

Figure 2:
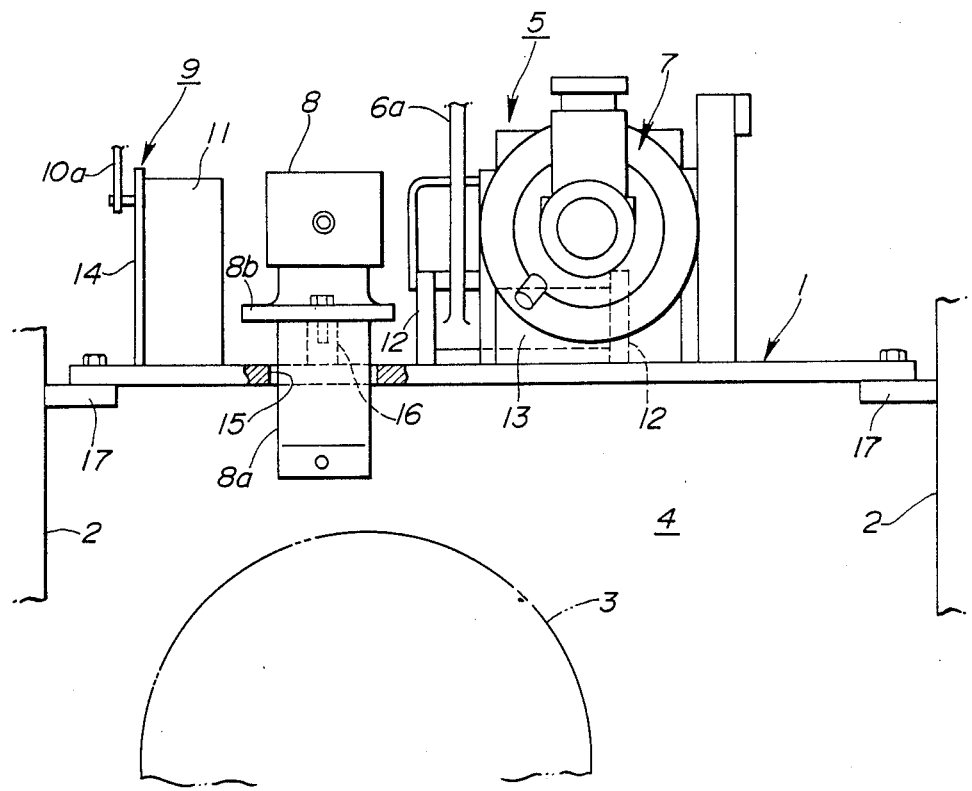
FIG. 2 is a view taken from the direction of the line II—II of FIG. 1.

As is seen from FIG. 2, the supporting plate 1 is formed with an aperture 15 for receiving therein a motor portion 8a of the vacuum pump 8. The aperture 15 is considerably larger in diameter than the motor portion 8a. The supporting plate 1 has around the aperture 15 three studs 16 on which three flanges 8b (see FIG. 1) of the vacuum pump 8 are mounted and secured thereto by bolts (no numerals). Thus, as is seen from FIG. 2, the vacuum pump 8 has the motor portion 8a projected into the traction motor room 4 reducing the height of a portion thereof projected upward from the supporting plate 1.

As is described hereinabove, the brake parts 5 and the accelerator parts 9 are previously mounted on the supporting plate 1 before the latter is mounted to the side frames 2 and 2 of the body. That is, in assembling procedure of the vehicle, the supporting plate 1 on which the brake parts 5 and the accelerator parts 9 have been subassembled is seated at its both sides on respective brackets 17 and 17 of the side frames 2 and 2 and then bolted to the same, as will be understood from FIG. 2.

In the following, advantages of the present invention will be described.

First, since the brake parts 5 and the accelerator parts 9 are mounted on the supporting plate 1 before the latter is mounted to the side frames 2 and 2 of the vehicle body, the assembly of the parts to the vehicle body is readily carried out. In fact, unlike the case of the aforementioned conventional parts-mounting arrangement, the assembly of the parts can be easily achieved without forcing the operator to stretch his hand or hands awkwardly.

Second, since each bracket on the supporting plate 1 is arranged to support a plurality of parts, the number of parts used is reduced.

Third, since the vacuum pump 8 has the motor portion 8a thereof projected into the traction motor room 4, the height of the upwardly projected part of the vacuum pump 8 from the supporting plate 1 is reduced considerably. This brings about a space saving for the parts-mounting area on the supporting plate 1.

Fourth, since the aperture 15 of the supporting plate 1 is large enough as compared with the motor portion 8a of the vacuum pump 8 and the three studs 16 of the supporting plate 1 provide a sufficient air communication space between the supporting plate 1 and the vacuum pump 8, air ventilation for the traction motor room 4 is effectively made. This is advantageous when considering that the traction motor 3 in the room 4 serves as a heat source under operation of the vehicle.

Fifth, since the supporting plate 1 serves as a so-called cross beam, the mechanical strength of the vehicle body is increased.

What is claimed is:

1. In an electrically powered motor vehicle having a traction motor, a traction motor room for housing therein said motor, and two side frames extending longitudinally along both sides of said traction motor room, an arrangement comprising:
   a first group of parts including a brake pedal, a brake booster and a vacuum pump for energizing said brake booster;
   a second group of parts including an accelerator pedal and an accelerator control unit;
   a supporting plate having said first and second groups of parts assembled thereon, said supporting plate supported by and secured to said side frames and extending across an upper open portion of said traction motor room; and
   means defining in said supporting plate an aperture through which a part of said vacuum pump is projected into said traction motor room.

2. An arrangement as claimed in claim 1, in which opposed ends of said supporting plate are bolted to respective brackets secured to said side frames.

3. An arrangement as claimed in claim 2 in which said aperture has a diameter sufficiently larger than said part of said vacuum pump thereby to define between a peripheral wall of said aperture and an outer surface of said part a considerable clearance through which air ventilation can maintained to the interior of said traction motor room.

4. An arrangement as claimed in claim 3, in which said supporting plate has around said aperture a plurality of studs on which flanges of said vacuum pump are seated in a manner to define a considerable clearance between said supporting plate and each of said flanges of the vacuum pump.

5. An arrangement as claimed in claim 4, in which said brake pedal and said brake booster are connected to said supporting plate through a common bracket.

6. An arrangement as claimed in claim 5, in which said accelerator pedal and said acceleration control unit are connected to said supporting plate through a common supporting wall bracket.

7. An arrangement as claimed in claim 4, in which said flanges of said vacuum pump are bolted to said studs of said supporting plate.

8. An arrangement as claimed in claim 1 wherein said first and second groups of parts are arranged on and secured to said supporting plate such that said first and second groups of parts and said supporting plate comprise a unit having means for readily securing said unit to and removing said unit from said side frames.

* * * * *